US012801523B2

(12) United States Patent
Liu

(10) Patent No.: US 12,801,523 B2
(45) Date of Patent: Nov. 17, 2026

(54) MEMORY SYSTEM AND OPERATING METHOD AND SYSTEM THEREOF

(71) Applicant: YANGTZE MEMORY TECHNOLOGIES CO., LTD., Wuhan (CN)

(72) Inventor: Jingsheng Liu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 19/236,389

(22) Filed: Jun. 12, 2025

(65) Prior Publication Data

US 2026/0203210 A1 Jul. 16, 2026

(30) Foreign Application Priority Data

Jan. 15, 2025 (CN) ......................... 202510066581.7

(51) Int. Cl.
*G06F 12/00* (2006.01)
*G06F 12/02* (2006.01)

(52) U.S. Cl.
CPC .. *G06F 12/0246* (2013.01); *G06F 2212/7205* (2013.01)

(58) Field of Classification Search
CPC ..................... G06F 12/0246; G06F 2212/7205
See application file for complete search history.

(56) References Cited

U.S. PATENT DOCUMENTS 11,449,122 B2 9/2022 Tang
11,645,007 B2 * 5/2023 Yoon ..................... G06F 3/0656 711/103
11,670,341 B2 6/2023 Tang
11,676,670 B2 6/2023 Guo
11,755,471 B2 9/2023 Hu
11,797,195 B2 10/2023 Guo et al.
2015/0052299 A1 * 2/2015 Mirichigni .......... G06F 13/1673 711/114
2022/0382466 A1 12/2022 Zhu et al.
2022/0382467 A1 12/2022 Zhu et al.
2023/0062729 A1 3/2023 Tan
2023/0195617 A1 6/2023 Cheng
2023/0230643 A1 7/2023 He
2024/0126685 A1 * 4/2024 Tan ..................... G06F 12/0246
2024/0160576 A1 * 5/2024 Boenapalli .......... G06F 12/1009
2024/0311300 A1 * 9/2024 Zhang ................. G06F 12/0804

FOREIGN PATENT DOCUMENTS

CN 111597076 B * 4/2024 ......... G06F 12/0646

* cited by examiner

*Primary Examiner* — Shawn X Gu
*Assistant Examiner* — Mohammad S Hasan
(74) *Attorney, Agent, or Firm* — Conley Rose, P.C.

(57) ABSTRACT

A memory system includes a memory device and a controller coupled with the memory device. The controller is configured to, in response to a first flag bit being in a state indicating to perform a first flush operation on data in a first group of memory blocks, and a link between the controller and a host entered a hibernate state, perform the first flush operation to write the data in the first group of memory blocks into a second group of memory blocks. The controller is configured to, in response to a second flag bit being in a state indicating to perform a second flush operation on data in the first group of memory blocks, perform the second flush operation to write the data in the first group of memory blocks into a third group of memory blocks.

20 Claims, 10 Drawing Sheets

MEMORY SYSTEM AND OPERATING METHOD AND SYSTEM THEREOF

CROSS-REFERENCE TO RELATED APPLICATIONS

The present disclosure claims priority to Chinese Patent Application No. 2025100665817, which was filed Jan. 15, 2025, and is hereby incorporated herein by reference in its entirety.

TECHNICAL FIELD

The present disclosure relates to the field of semiconductor technologies, and in particular, to a memory system and an operating method and system thereof.

BACKGROUND

With the rapid development of data storage technologies, more and more data memory systems appear in electronic devices used by people, such as Secure Digital Memory Card (SD card), Universal Flash Storage (UFS), Solid State Drive (SSD) and so on.

SUMMARY

Examples of the present disclosure provide a memory system and an operating method and system thereof.

According to a first aspect, the present disclosure provides a memory system including a memory device and a controller coupled to the memory device, where the memory device includes at least a first group of memory blocks, a second group of memory blocks and a third group of memory blocks, and the controller is configured to:

in response to a first flag bit being in a state indicating to perform a first flush operation on data in the first group of memory blocks, and a link between the controller and a host entered a hibernate state, perform the first flush operation to write the data in the first group of memory blocks into the second group of memory blocks; and in response to a second flag bit being in a state indicating to perform a second flush operation on data in the first group of memory blocks, perform the second flush operation to write the data in the first group of memory blocks into the third group of memory blocks.

In an example, memory cells in the first group of memory blocks are configured to store 1 bit of data; memory cells in the second group of memory blocks are configured to store N bits of data; memory cells in the third group of memory blocks are configured to store M bits of data; N is an integer greater than 1, and M is an integer greater than N.

In an example, the controller is further configured to:

in response to an amount of data stored in the first group of memory blocks being greater than or equal to a preset data amount, configure the second flag bit to be in the state indicating to perform the second flush operation on the data in the first group of memory blocks.

In an example, the controller is further configured to:

perform a first erase operation on the second group of memory blocks before writing the data in the first group of memory blocks into the second group of memory blocks; and perform a second erase operation on the third group of memory blocks before writing the data in the first group of memory blocks into the third group of memory blocks.

In an example, the controller is further configured to:

receive written data before performing the first flush operation and the second flush operation; and in response to a third flag bit being in a state indicating to write the data into the first group of memory blocks, write the written data into the first group of memory blocks.

In an example, the controller is further configured to:

perform a third erase operation on the first group of memory blocks before writing the written data into the first group of memory blocks.

In an example, the controller is further configured to:

perform a fourth erase operation on the first group of memory blocks after writing the data in the first group of memory blocks into the second group of memory blocks.

In an example, the memory device includes a three-dimensional NAND memory.

In an example, memory cells in the first group of memory blocks are configured as single-level cells (SLCs); memory cells in the second group of memory blocks are configured as a triple-level cells (TLCs); and memory cells in the third group of memory blocks are configured as a quad-level cells (QLCs).

In a second aspect, the present disclosure provides a system including a memory system and a host coupled to the memory system; the memory system includes a memory device and a controller coupled to the memory device; the memory device includes at least a first group of memory blocks, a second group of memory blocks and a third group of memory blocks;

The host is configured to send a first request, the first request indicates to configure a first flag bit to be in a state indicating to perform a first flush operation on data in the first group of memory blocks;

the controller is configured to: in response to the first request, configure the first flag bit to be in the state indicating to perform the first flush operation on the data in the first group of memory blocks; and in response to the first flag bit being in the state indicating to perform the first flush operation on the data in the first group of memory blocks, and a link between the controller and the host entered a hibernate state, perform the first flush operation to write the data in the first group of memory blocks into the second group of memory blocks;

the host is further configured to send a second request, the second request indicates to configure a second flag bit to be in a state indicating to perform a second flush operation on data in the first group of memory blocks;

the controller is further configured to: in response to the second request, configure the second flag bit to be in the state indicating to perform the second flush operation on the data in the first group of memory blocks; and in response to the second flag bit being in the state indicating to perform the second flush operation on the data in the first group of memory blocks, perform the second flush operation to write the data in the first group of memory blocks into the third group of memory blocks.

In an example, memory cells in the first group of memory blocks are configured to store 1 bit of data; memory cells in the second group of memory blocks are configured to store N bits of data; memory cells in the third group of memory blocks are configured to store M bits of data; N is an integer greater than 1, and M is an integer greater than N.

In an example, the controller is further configured to: in response to an amount of data stored in the first group of memory blocks being greater than or equal to a preset data amount, send a third request; and the host is further configured to: in response to the third request, generate the second request.

In an example, the controller is further configured to:

perform a first erase operation on the second group of memory blocks before writing the data in the first group of memory blocks into the second group of memory blocks; and perform a second erase operation on the third group of memory blocks before writing the data in the first group of memory blocks into the third group of memory blocks.

In an example, the host is further configured to: send a fourth request before sending the first request, wherein the fourth request indicates to configure a third flag bit to be in a state indicating to write data into the first group of memory blocks; and the controller is further configured to: in response to the fourth request, configure the third flag bit to be in the state indicating to write data into the first group of memory blocks.

In an example, the host is further configured to send a write command and written data; and the controller is further configured to: in response to the write command, receive the written data; and in response to the third flag bit being in the state indicating to write data into the first group of memory blocks, write the written data into the first group of memory blocks.

In an example, the controller is further configured to:

perform a third erase operation on the first group of memory blocks before writing the written data into the first group of memory blocks.

In an example, the controller is further configured to:

perform a fourth erase operation on the first group of memory blocks after writing the data in the first group of memory blocks into the second group of memory blocks.

In a third aspect, the present disclosure provides an operating method for a memory system, including:

in response to a first flag bit being in a state indicating to perform a first flush operation on data in a first group of memory blocks, and a link between a controller and a host entered a hibernate state, performing the first flush operation to write the data in the first group of memory blocks into a second group of memory blocks; and in response to a second flag bit being in a state indicating to perform a second flush operation on data in the first group of memory blocks, performing the second flush operation to write the data in the first group of memory blocks into a third group of memory blocks.

In an example, the operating method for the memory system further includes:

configuring memory cells in the first group of memory blocks to store 1 bit of data;

configuring memory cells in the second group of memory blocks to store N bits of data; and configuring memory cells in the third group of memory blocks to store M bits of data; wherein N is an integer greater than 1, and M is an integer greater than N.

In an example, the operating method for the memory system further includes:

in response to an amount of data stored in the first group of memory blocks being greater than or equal to a preset data amount, configuring the second flag bit to be in the state indicating to perform the second flush operation on the data in the first group of memory blocks.

In an example, the operating method for the memory system further includes:

performing a first erase operation on the second group of memory blocks before writing the data in the first group of memory blocks into the second group of memory blocks; and performing a second erase operation on the third group of memory blocks before writing the data in the first group of memory blocks into the third group of memory blocks.

In an example, the operating method for the memory system further includes:

receiving written data before performing the first flush operation and the second flush operation; and in response to a third flag bit being in a state indicating to write the data into the first group of memory blocks, writing the written data into the first group of memory blocks.

In an example, the operating method for the memory system further includes:

performing a third erase operation on the first group of memory blocks before writing the written data into the first group of memory blocks.

In an example, the operating method for the memory system further includes:

performing a fourth erase operation on the first group of memory blocks after writing the data in the first group of memory blocks into the second group of memory blocks.

DETAILED DESCRIPTION

Figure 1:
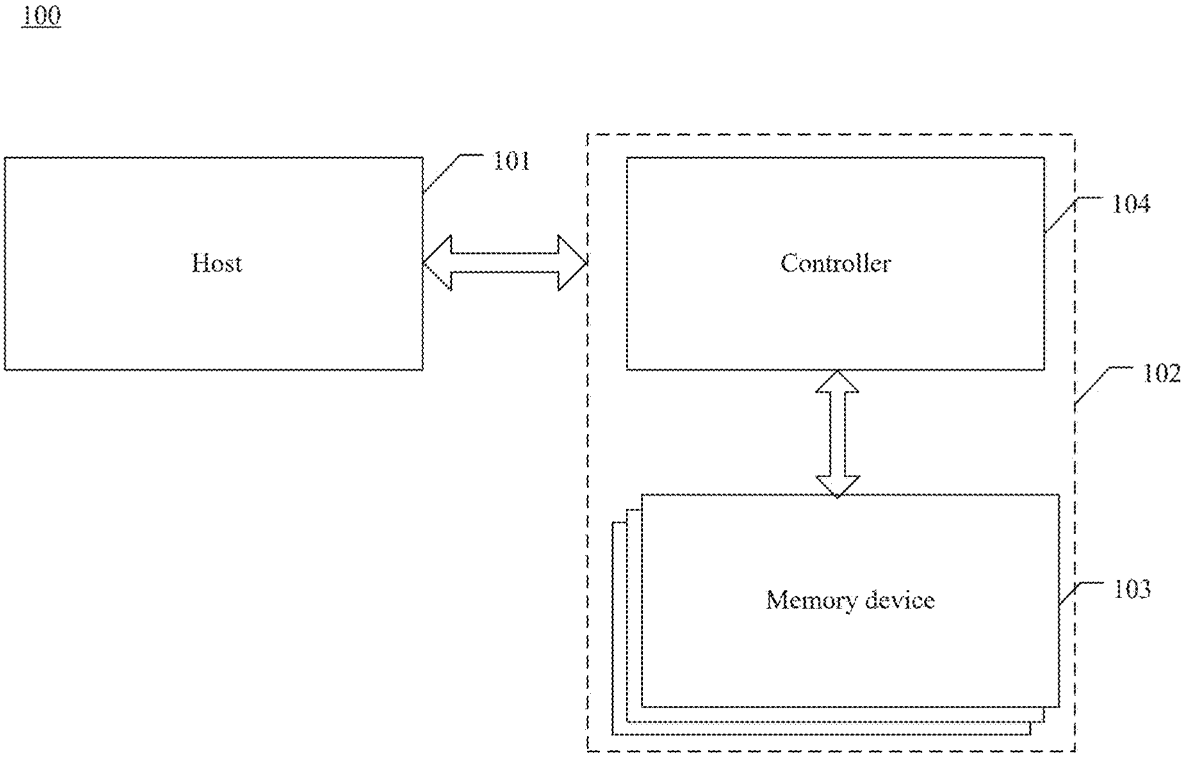
FIG. 1 is a schematic diagram of an example system with a memory system provided by an example of the present disclosure.

Examples of the present disclosure will be described in more detail below with reference to the accompanying drawings. Although examples of the present disclosure are shown in the drawings, it should be understood that the present disclosure may be implemented in various forms and should not be limited by the examples set forth herein. Rather, these examples are provided so that the present disclosure can be understood more thoroughly, and the scope of the disclosure can be completely conveyed to those skilled in the art.

In the following description, numerous specific details are given in order to provide a more thorough understanding of the present disclosure. However, it will be apparent to those skilled in the art that the present disclosure may be practiced without one or more of these details. In other examples, to avoid confusion with the present disclosure, some technical features known in the art are not described; for example, not all the features of actual examples are described herein, and well-known functions and structures are not described in detail.

In the drawings, like reference numerals refer to like elements throughout.

It should be understood that spatial relationship terms such as "beneath", "below", "lower," "under", "over", "upper" and the like may be used herein for ease of description to describe the relationship of one element or feature to another element or feature shown in the figures. It should be appreciated that, in addition to the orientations shown in the figures, the spatial relationship terms are intended to also include different orientations of the devices in use and operation. For example, if the devices in the figures are flipped, then the element or feature described as being "below" or "under" or "beneath" another element or feature will be oriented "on" the other element or feature. Thus, the exemplary terms "below" and "beneath" can include both up orientation and down orientation. The devices may be oriented otherwise (rotated 90 degrees or other orientations) and the spatial description terms used herein are interpreted accordingly.

The terminology used herein is for the purpose of describing examples only and not as a limitation of the present disclosure. As used herein, the singular forms "a," "an," and "the" are also intended to include the plural forms unless the context clearly indicates otherwise. It should also be understood that the terms "comprising" and/or "including," when used in this specification, determine the presence of the stated feature, integer, step, operation, element and/or component, but do not preclude the presence or addition of one or more other features, integers, steps, operations, elements, components and/or groups. As used herein, the term "and/or" includes any and all combinations of related listed items.

The memory system in the examples of the present disclosure includes but is not limited to a memory system including a three-dimensional NAND memory. For ease of understanding, a memory system including a three-dimensional NAND memory is taken as an example to describe the memory system provided by the present disclosure.

FIG. 1 is a schematic diagram of an example system with a memory system provided by an example of the present disclosure. In the example of the present disclosure, the system 100 may be a mobile phone, a desktop computer, a laptop computer, a tablet computer, a vehicle computer, a game console, a printer, a positioning device, a wearable electronic device, an intelligent sensor, a virtual reality (VR) device, an augmented reality (AR) device, or any other suitable electronic device with a memory therein. As shown in FIG. 1, system 100 may include a host 101 and a memory system 102, and the memory system 102 may include one or more memory devices 103 and a controller 104. The host 101 may include a processor of an electronic device, for example, a central processing unit (CPU), or a system on a chip (SoC), for example, an application processor (AP). The host 101 may be configured to send data to or receive data from the memory system 102.

In some examples, the controller 104 is coupled to the memory device 103 and the host 101 and is configured to control the memory device 103. The controller 104 may manage data stored in the memory device 103 and communicate with the host 101. In some examples, the controller 104 is designed to operate in a low duty cycle environment, such as in a secure digital card, a Compact Flash Card (CFC), a Universal Serial BUS (USB) flash drive, or other medium for use in electronic devices such as personal computer, digital camera, mobile phone, etc. In some other examples, the controller 104 is designed to operate in a high duty cycle environment, such as in a solid-state drive or an embedded Multi-Media Card (eMMC).

In some examples, the controller 104 and the one or more memory devices 103 may be integrated into various types of storage devices, for example, the memory system 102 may be implemented and packaged into different types of terminal electronic products.

Figure 2:
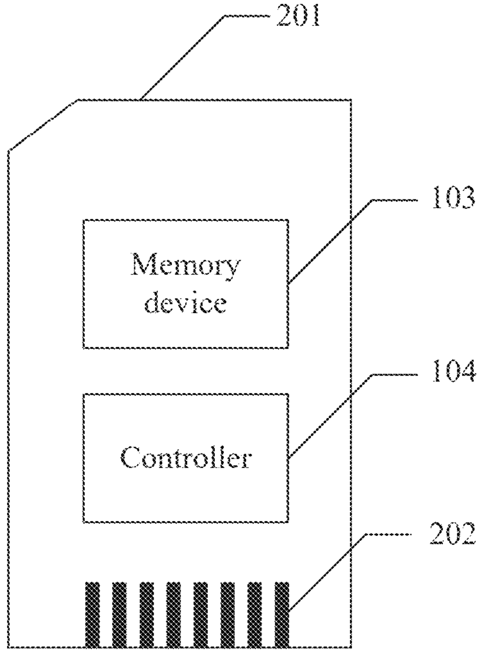
FIG. 2 is a schematic diagram of a memory card provided by an example of the present disclosure.
Figure 3:
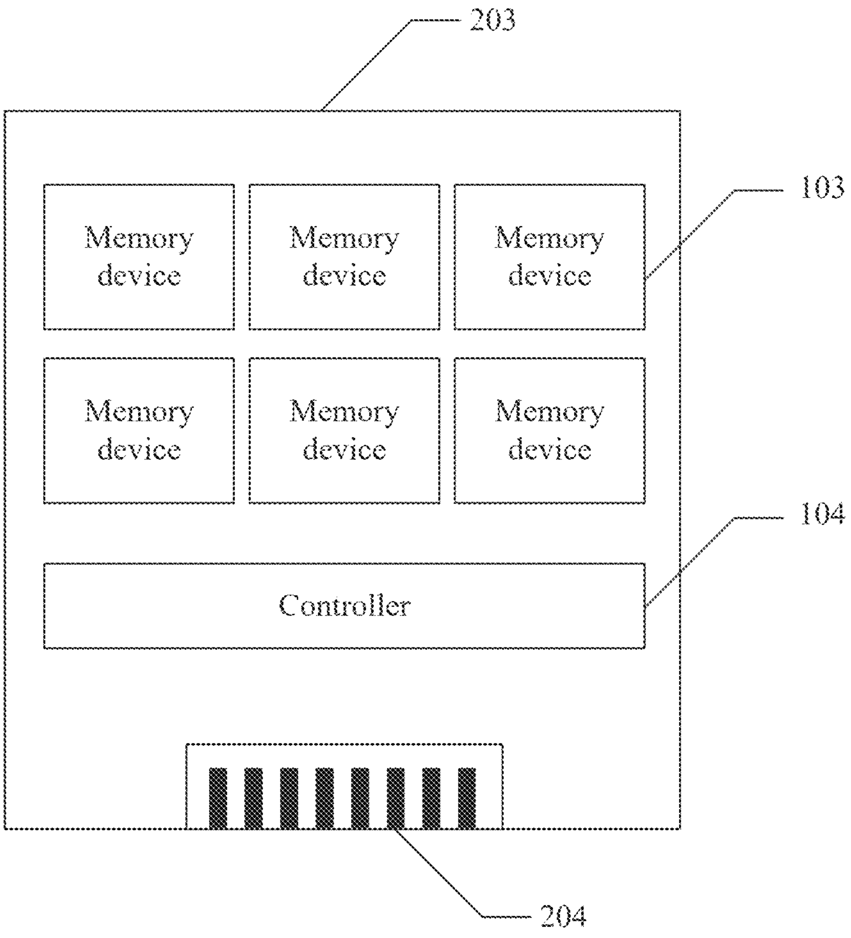
FIG. 3 is a schematic diagram of a solid-state drive provided by an example of the present disclosure.

In one example as shown in FIG. 2, the controller 104 and a single memory device 103 may be integrated into a memory card 201. The memory card 201 may be one of a compact flash memory card, a smart media card (SMC), a memory stick (MS), a multi-media card (MMC) (such as an RS-MMC, an MMCmicro, an eMMC, or the like), a secure digital card (such as a MiniSD card, a Micro SD card, an SDHC card, or the like), or a universal flash memory card. The memory card 201 may also include a memory card connector 202 that couples the memory card 201 with a host (e.g., host 101 in FIG. 1). In another example as shown in FIG. 3, the controller 104 and the plurality of memory devices 103 may be integrated into SSD 203. SSD 203 may also include an SSD connector 204 that couples SSD 203 with a host (e.g., host 101 in FIG. 1). In some examples, the storage capacity and/or operating speed of SSD 203 is greater than the storage capacity and/or operating speed of the memory card 201.

Figure 4:
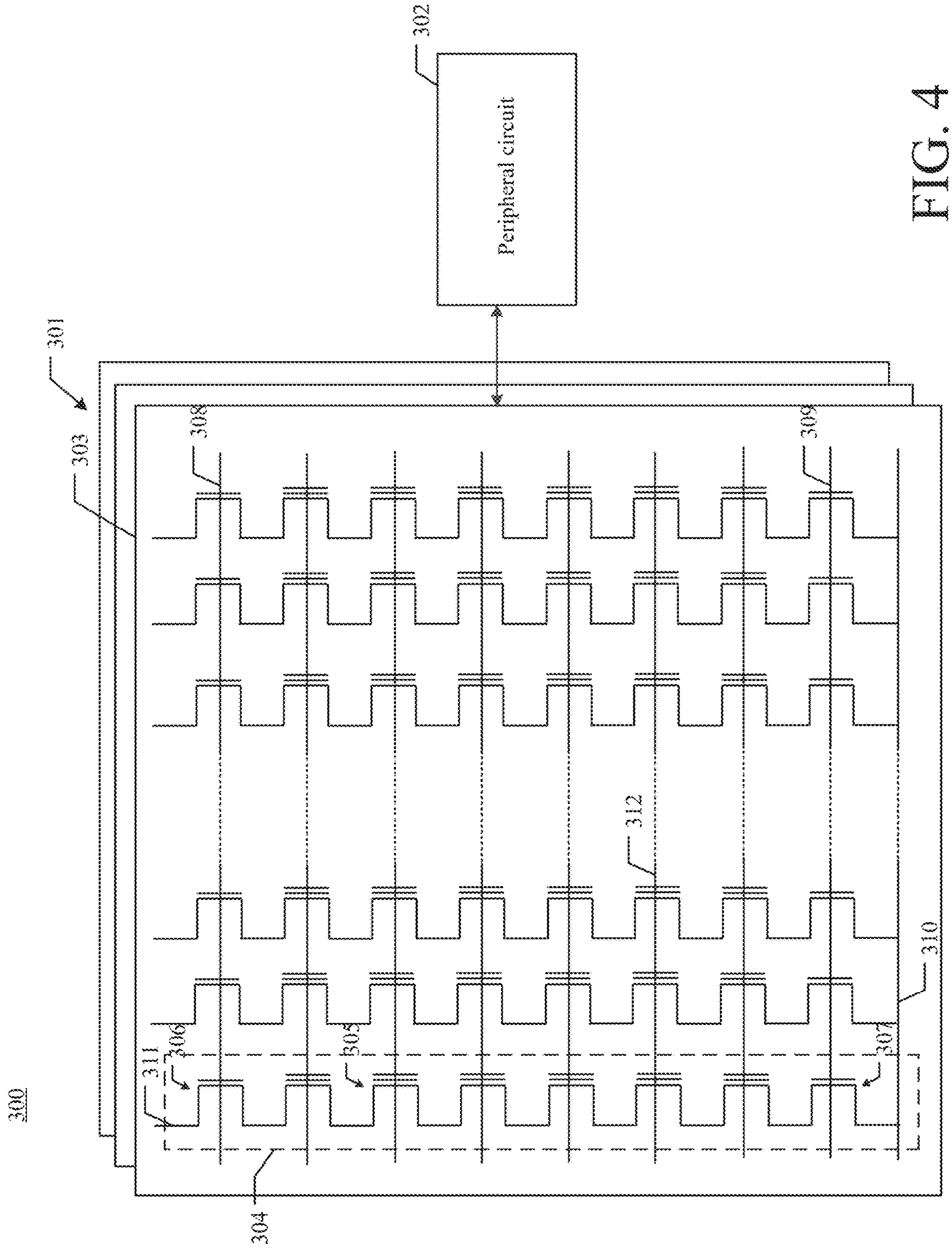
FIG. 4 is a schematic circuit diagram of an example memory device including a peripheral circuit provided by an example of the present disclosure.

FIG. 4 is a schematic circuit diagram of an example memory device 300 including a peripheral circuit provided by an example of the present disclosure. The memory device 300 may be an example of the memory device 103 in FIG. 1. The memory device 300 may include a memory array 301 and a peripheral circuit 302 coupled to the memory array 301. Taking the memory array 301 being a three-dimensional NAND memory array as an example for illustration, the memory cells 305 are NAND memory cells and are provided in the form of an array of memory strings 304, and each memory string 304 extends vertically above a substrate (not shown). In some examples, each memory string 304 includes a plurality of memory cells 305 coupled in series and stacked vertically. Each memory cell 305 may hold a continuous analog value, e.g., voltage or charge, which depends on the number of electrons trapped within the region of the memory cell 305. Each memory cell 305 may be a floating gate type memory cell including a floating gate transistor, or a charge trapping type memory cell including a charge trapping transistor.

In some examples, each memory cell 305 is a single level cell (SLC) that has two possible memory states and thus can store one bit of data. For example, a first memory state "0" may correspond to a first threshold voltage distribution and a second memory state "1" may correspond to a second threshold voltage distribution. In some examples, each memory cell 305 is a multi-level cell capable of storing more than a single bit of data in four or more memory states, e.g., a multi-level cell (MLC) storing two bits per cell, a triple level cell (TLC) storing three bits per cell, or a quad-level cell (QLC) storing four bits per cell.

As shown in FIG. 4, each memory string 304 may include a bottom select transistor (BST) 307 at its source terminal and a top select transistor (TST) 306 at its drain terminal. The bottom select transistor 307 and the top select transistor 306 may be configured to activate the selected memory string 304 during read and program operations.

In some examples, the memory array 301 includes a plurality of memory blocks 303, and sources of the memory strings 304 in a same memory block 303 may be coupled through a common source line (CSL) 310. For example, all memory strings 304 in the same memory block 303 have an array common source (ACS). According to some examples, the top select transistor 306 of each memory string 304 is coupled to a respective bit line (BL) 311 from which data may be read or written via an output bus (not shown). In some examples, each memory string 304 is configured to be selected or deselected by applying a select voltage (e.g., a voltage above a threshold voltage of the top select transistor 306) or a deselect voltage (e.g., 0V) to a top select gate (TSG) of the respective top select transistor 306 through one or more top select lines (TSL) 308 and/or by applying a select voltage (e.g., a voltage above a threshold voltage of the bottom select transistor 307) or a deselect voltage (e.g., 0V) to a bottom select gate (BSG) of the respective bottom select transistor 307 through one or more bottom select lines (BSL) 309.

In some examples, each memory block 303 is a basic unit of data for an erase operation, e.g., all memory cells 305 on the same memory block 303 are erased simultaneously. To erase the memory cells 305 in a selected memory block, the common source line 310 coupled to the selected memory block and unselected memory blocks in the same plane as the selected memory block may be biased with an erase voltage. It should be appreciated that in some examples, the erase operation may be performed at a half memory block level, at a quarter memory block level, or at a level having any suitable number of memory blocks or any suitable fraction of a memory block. The memory cells 305 of adjacent memory strings 304 may be coupled by a word line 312 that selects which row of memory cells 305 is affected by a read or program operation.

In some examples, the peripheral circuit 302 may include any suitable analog, digital, and mixed signal circuit for achieving operation on the memory array 301 by applying voltage and/or current signals to each target memory cell 305 and sensing voltage and/or current signals from each target memory cell 305 through the bit line 311, word line 312, common source line 310, bottom select line 309, and top select line 308. The peripheral circuit 302 may include various types of peripheral circuit formed using metal-oxide-semiconductor technology.

Figure 5:
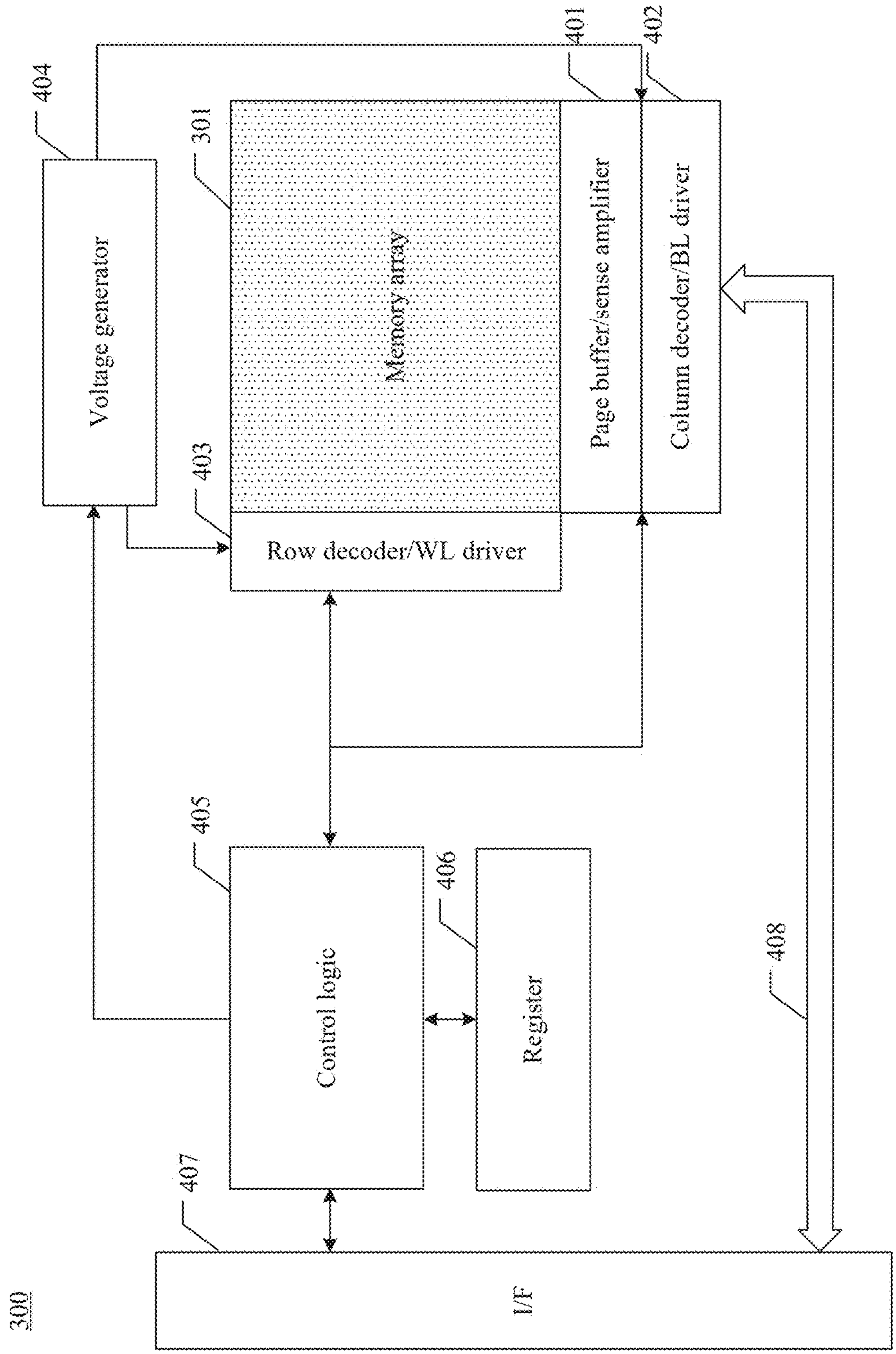
FIG. 5 is a schematic diagram of a memory device provided by an example of the present disclosure.

FIG. 5 is a schematic diagram of a memory device provided by an example of the present disclosure. Referring to FIG. 4 and FIG. 5 in combination, the peripheral circuit 302 may include a page buffer/sense amplifier 401, a column decoder/bit line driver 402, a row decoder/word line driver 403, a voltage generator 404, a control logic 405, a register 406, a flash interface 407, and a data bus 408. It should be understood that in some examples, the peripheral circuit may further include additional circuits not shown in FIG. 5.

The page buffer/sense amplifier 401 may be configured to read data from the memory array 301 and program (write) data to the memory array 301 according to a control signal from the control logic 405. In one example, the page buffer/sense amplifier 401 may store a page of program data (written data) to be programmed to the memory array 301. In another example, the page buffer/sense amplifier 401 may perform a program verify operation to ensure that data has been correctly programmed into the memory cells coupled to the selected word line. In yet another example, the page buffer/sense amplifier 401 may also sense a low power signal from a bit line representing a data bit stored in a memory cell and amplify a small voltage swing to an identifiable logic level in a read operation. The column decoder/bit line driver 402 may be configured to be controlled by the control logic 405 and to select one or more memory strings by applying a bit line voltage generated from the voltage generator 404.

Row decoder/word line driver 403 may be configured to be controlled by the control logic 405, and select/deselect a memory block of the memory array 301 and select/deselect a word line of the memory block. The row decoder/word line driver 403 may also be configured to drive a word line using a word line voltage generated from the voltage generator 404. In some examples, the row decoder/word line driver 403 may also select/deselect and drive the bottom select line and the top select line. As described in detail below, the row decoder/word line driver 403 is configured to perform a program operation on the memory cells coupled to the selected word line (s). The voltage generator 404 may be configured to be controlled by the control logic 405 and generate a word line voltage (e.g., a read voltage, a program voltage, a pass voltage, a local voltage, a verify voltage, etc.), a bit line voltage, and a source line voltage to be supplied to the memory array 301.

The control logic 405 may be coupled to each peripheral circuit described above and configured to control the operation of each peripheral circuit. The register 406 may be coupled to the control logic 405 and include a status register, a command registers, and an address register for storing status information, command operation code (OP code), and command address for controlling the operation of each peripheral circuit. The flash interface 407 may be coupled to the control logic 405, and act as a control buffer to buffer a control command received from a host (not shown) and relay the control command to the control logic 405 and to buffer status information received from the control logic 405 and relay the status information to a controller. The flash interface 407 may also be coupled to the column decoder/bit line driver 402 via the data bus 408, and act as a data I/O interface and data buffer to buffer and send the data to the memory array 301 or receive and buffer data from the memory array 301.

Figure 6:
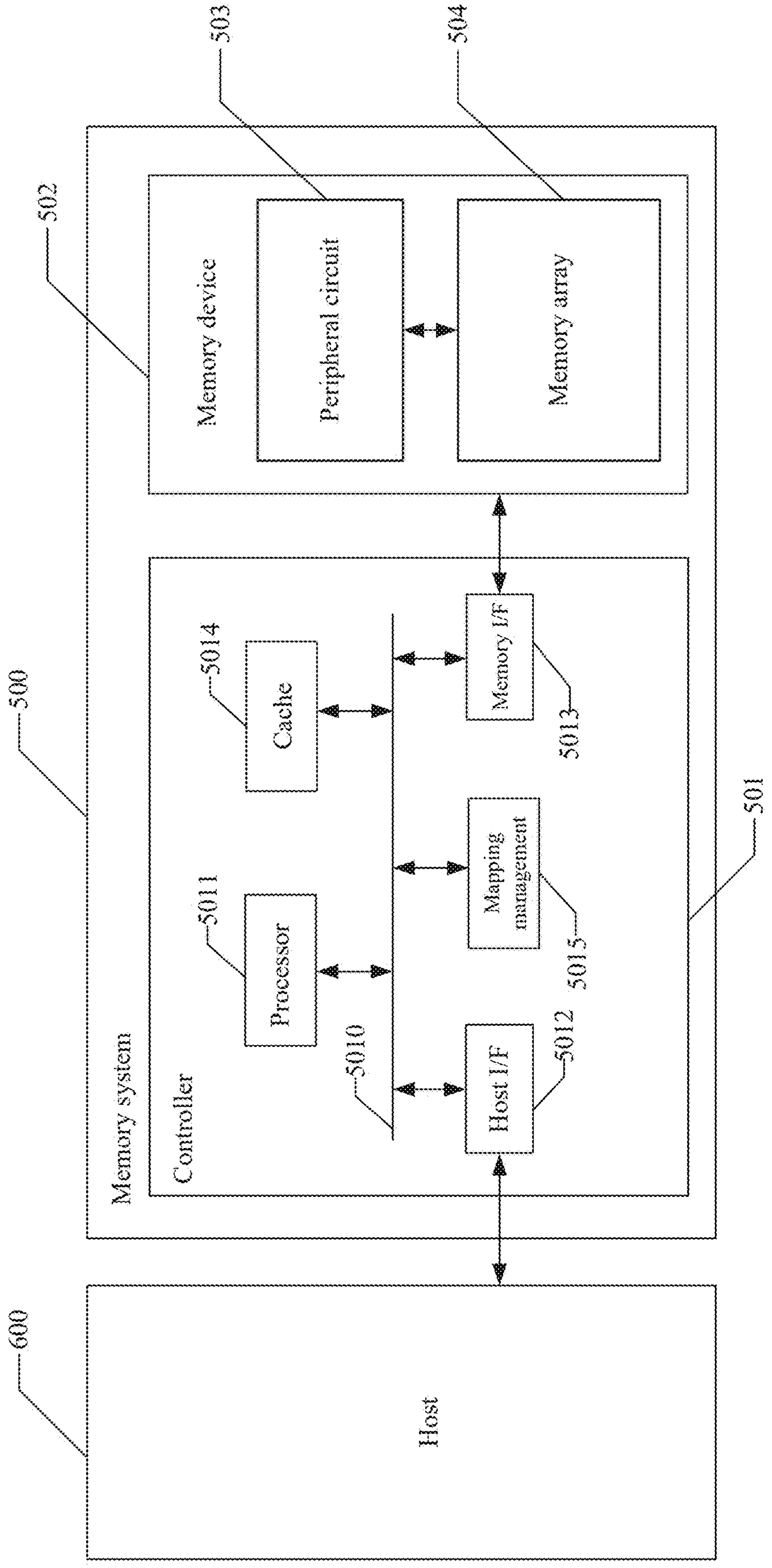
FIG. 6 is a schematic diagram of a system provided by an example of the present disclosure.

In some examples, FIG. 6 is a schematic diagram of a system provided by an example of the present disclosure. The system includes a memory system 500 and a host 600 coupled to the memory system 500. The memory system 500 includes a memory device 502 and a controller 501 coupled to the memory device 502. The memory device 502 includes a three-dimensional NAND memory. In an example, the memory device 502 includes a memory array 504 and a peripheral circuit 503 coupled to the memory array 504, and the memory array 504 may be the memory array 301 including NAND memory cells provided in the foregoing examples.

In some examples, the controller 501 may include a processor 5011, and a host interface 5012, a memory interface 5013, and a cache 5014 coupled to the processor 5011 through a bus 5010. The controller 501 may be coupled to the host 600 through the host interface 5012, and coupled to the memory device 502 through the memory interface 5013. During data writing, the host 600 may send a write command to the memory system 500, the controller 501 may receive the write command, receive written data and a logical address of the written data in response to the write command, and temporarily store the written data in the cache 5014. The mapping management module 5015 may allocate a physical address to the written data, and establish a mapping relationship of logical address to physical address (L2P) for the written data. The controller 501 may send a program command to the memory device 502 through the memory interface 5013. The memory device 502 may receive the program command, receive written data and a physical address of the written data in response to the program command, and store the written data to a location in the memory array 504 corresponding to the physical address of the written data.

In some examples, the memory system 500 may be a universal flash storage (UFS) system applied to a mobile device, and the host interface 5012 in the controller 501 may be a UFS interface, which may communicate with the host 600 through a UFS interface protocol.

With the increase of requirements of mobile devices for storage performance, especially in high-load application scenarios, such as large games and high-definition video recording, it is required that the memory system 500 has both high storage density and fast writing speed. In order to further meet the requirement of the mobile devices for the storage density, the memory cells in the memory device 502 may be configured to store multi-bit data, for example, the memory cells may be configured as TLCs. However, the programming efficiency of TLC is low, resulting in a low data writing speed, which may cause the memory system to fail to meet the requirement of high-load application scenarios. Therefore, it is necessary to improve the write performance of the memory system while improving the storage density.

In this regard, the present disclosure proposes the following examples.

Figure 7:
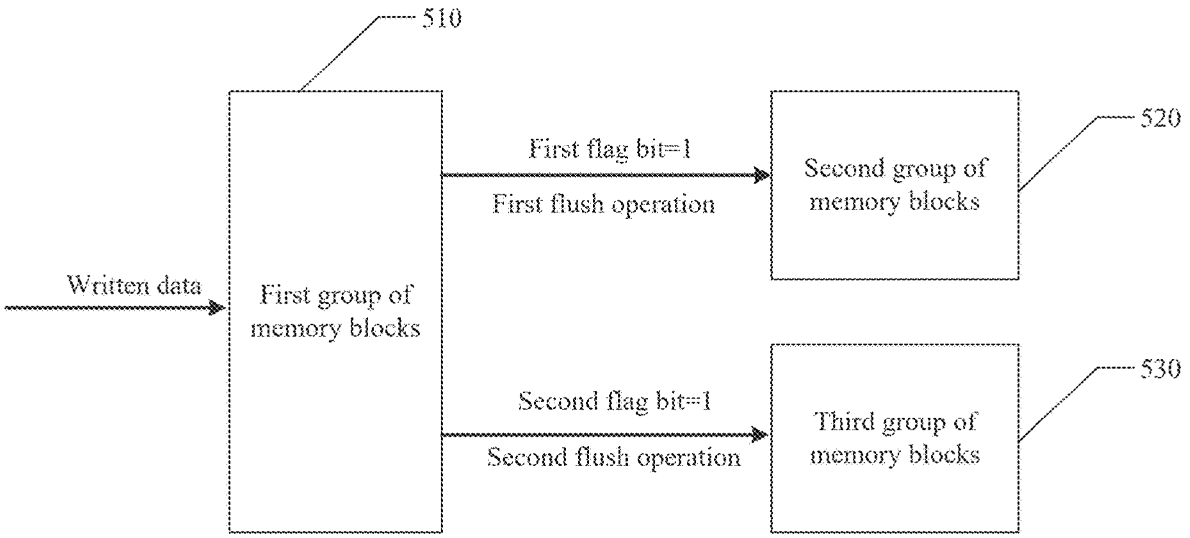
FIG. 7 is a schematic diagram of multiple groups of memory blocks in a memory system provided by an example of the present disclosure.

The present disclosure provides a memory system, and FIG. 7 is a schematic diagram of multiple groups of memory blocks in the memory system provided by an example of the present disclosure. Referring to FIG. 6 and FIG. 7 in combination, the memory system 500 includes a memory device 502 and the controller 501 coupled to the memory device 502. The memory device 502 includes at least a first group of memory blocks 510, a second group of memory blocks 520 and a third group of memory blocks 530.

Here, the first group of memory blocks 510, the second group of memory blocks 520 and the third group of memory blocks 530 may respectively include one or more memory blocks, and a memory block may be the memory block 303 including NAND memory cells shown in FIG. 4. The number of the memory blocks included in each group of memory blocks is not limited in the present disclosure.

In some examples, memory cells in the first group of memory blocks 510 are configured to store 1 bit of data; memory cells in the second group of memory blocks 520 are configured to store N bits of data; memory cells in the third group of memory blocks 530 are configured to store M bits of data; N is an integer greater than 1, and M is an integer greater than N.

In some examples, memory cells in the first group of memory blocks 510 are configured as single-level cells (SLCs); memory cells in the second group of memory blocks 520 are configured as triple-level cells (TLCs); and memory cells in the third group of memory blocks 530 are configured as quad-level cells (QLCs).

In some examples, the controller 501 is configured to: receive written data, and in response to a third flag bit being in a state indicating to write data into the first group of memory blocks 510, write the written data into the first group of memory blocks 510.

In an example of the present disclosure, in order to meet the requirement for higher write performance, the first group of memory blocks 510 in the memory array 504 may be used as a write booster buffer. The memory cells in the first group of memory blocks 510 are configured as SLCs. When the write booster function is enabled, for example, the third flag bit is in a state indicating to write data into the first group of memory blocks 510, the controller 501 may be configured to write the written data into the first group of memory blocks 510.

It may be understood that the speed of writing data into the first group of memory blocks 510 is higher than the speed of writing data into the second group of memory blocks 520 or the third group of memory blocks 530, so that the controller 501 may more quickly complete the write operation and generate completion response information for the write operation, thereby improving write performance of the memory system 500.

In some examples, the controller 501 is configured to: in response to a first flag bit being in a state indicating to perform a first flush operation on the data in the first group of memory blocks 510, and a link between the controller 501 and the host 600 entered a hibernate state, perform the first flush operation to write the data in the first group of memory blocks 510 into the second group of memory blocks 520; and in response to a second flag bit being in a state indicating to perform a second flush operation on the data in the first group of memory blocks 510, perform the second flush operation to write the data in the first group of memory blocks 510 into the third group of memory blocks 530.

In some examples, the first flag bit, the second flag bit, and the third flag bit may be stored in the cache 5014 of the controller, here the cache 5014 may include a register and/or a static random-access memory (SRAM).

In an example of the present disclosure, when the write booster function is enabled, the written data may be written into the first group of memory blocks 510 to improve the write performance of the memory system 500. In order to maintain a higher storage capacity while improving the write performance, the controller 501 may be configured to perform a flush operation to write the data in the first group of memory blocks 510 into the second group of memory blocks 520 or the third group of memory blocks 530 with a higher storage density, thus the storage capacity of the first group of memory blocks 510 may be released, so that more written data may be written into the first group of memory blocks 510 through the write booster mode.

In an example of the present disclosure, the controller 501 may be configured to perform the first flush operation or the second flush operation on the data in the first group of memory blocks 510 based on the state of the first flag bit and the second flag bit. In an example, in a case that the first flag bit is set to 1, making the first flag bit being in a state indicating to perform the first flush operation on the data in the first group of memory blocks 510, the controller 501 may be configured to: perform the first flush operation to write the data in the first group of memory blocks 510 into the second group of memory blocks 520 when the link between the controller 501 and the host 600 enters the hibernate state. In a case that the second flag bit is set to 1, making the second flag bit being in a state indicating to perform the second flush operation on the data in the first group of memory blocks 510, the controller 501 may be configured to: perform the second flush operation to write the data in the first group of memory blocks 510 into the third group of memory blocks 530.

In some examples, the first flag bit may be fWriteBoosterBufferFlushDuringHibernate defined in the UFS specification; the second flag bit may be fWriteBoosterBufferFlushEn defined in the UFS specification; the third flag bit may be fWriteBoosterEn defined in the UFS specification; and the hibernate state may be HIBERN8 state defined in the UFS specification. When no data transmission or other operation is performed between the host 600 and the controller 501, the link between the host 600 and the controller 501 may enter the hibernate state to save power consumption.

It can be understood that since the memory cells in the second group of memory blocks 520 are configured to store N bits of data, the memory cells in the third group of memory blocks 530 are configured to store M bits of data, and M is greater than N, thus with the data amount being the same, the speed of writing the data in the first group of memory blocks 510 into the second group of memory blocks 520 will be higher than the speed of writing the data in the first group of memory blocks 510 into the third group of memory blocks 530. The controller 501 is configured to write the data in the first group of memory blocks 510 into the second group of memory blocks 520 instead of the third group of memory blocks 530 when the first flag bit is 1 and the link is in the hibernate state, so that the frequent and short hibernate states may be utilized to perform the flush operations more quickly to release the storage capacity of the first group of memory blocks 510 timely, thereby improving the write performance of the memory system 500. In addition, when the link exits the hibernate state, the response speed of the controller 501 to the first batch of input/output commands received through the host interface 5012 may also be kept relatively fast, thereby comprehensively improving the input/output performance of the memory system 500.

In some examples, the controller 501 is further configured to: in response to an amount of data stored in the first group of memory blocks 510 being greater than or equal to a preset data amount, configure the second flag bit to be in the state indicating to perform the second flush operation on the data in the first group of memory blocks 510.

It may be understood that, in some application scenarios, the link between the controller 501 and the host may remain in a working state for a long time. In this case, in order to enable the write booster function to run normally, the controller 501 may configure the second flag bit to be in a state indicating to perform the second flush operation on the data in the first group of memory blocks 510 in a case that the amount of data stored in the first group of memory blocks 510 is greater than or equal to the preset data amount. Further, the controller 501 may perform the second flush operation on the data in the first group of memory blocks 510 in response to the second flag bit being in the state indicating to perform the second flush operation on the data in the first group of memory blocks 510, so as to write the data in the first group of memory blocks 510 into the third group of memory blocks 530. Because in this case, the amount of data in the first group of memory blocks 510 is relatively large, thus writing the data in the first group of memory blocks 510 into the third group of memory blocks 530 with a relatively large storage density instead of the second group of memory blocks 520 may avoid the case in which the data in the second group of memory blocks 520 still needs to be transferred to the third group of memory blocks 530, so that the flush operation may be completed in a more efficient manner.

It should be noted that, if the case in which the amount of data stored in the first group of memory blocks 510 is greater than or equal to the preset data amount does not occur in a case that the first flag bit is configured to indicate to perform the first flush operation on the data in the first group of memory blocks 510, the controller 501 will not perform the second flush operation.

In some examples, the controller 501 is further configured to: perform a first erase operation on the second group of memory blocks 520 before writing the data in the first group of memory blocks 510 into the second group of memory blocks 520; perform a second erase operation on the third group of memory blocks 530 before writing the data in the first group of memory blocks 510 into the third group of memory blocks 530; and perform a third erase operation on the first group of memory blocks 510 before writing the written data into the first group of memory blocks 510.

In some examples, there may be no substantial difference between the memory blocks in the first group of memory blocks 510, the memory blocks in the second group of memory blocks 520, and the memory blocks in the third group of memory blocks 530 before any data is written to the memory device 502. When the write booster function is enabled, the plurality of memory blocks in the memory array 504 may be configured as the first group of memory blocks 510, the second group of memory blocks 520 and the third group of memory blocks 530 respectively. In an example, when a memory block needs to be configured as a memory block in the second group of memory blocks 520, a first erase operation may be performed on the memory block, making the memory cells in the memory block to be all in a first erase state; when a memory block needs to be configured as a memory block in the third group of memory blocks 530, a second erase operation may be performed on the memory block, making the memory cells in the memory block to be all in a second erase state; and when a memory block needs to be configured as a memory block in the first group of memory blocks 510, a third erase operation may be performed on the memory block, making the memory cells in the memory block to be all in a third erase state.

Figure 8:
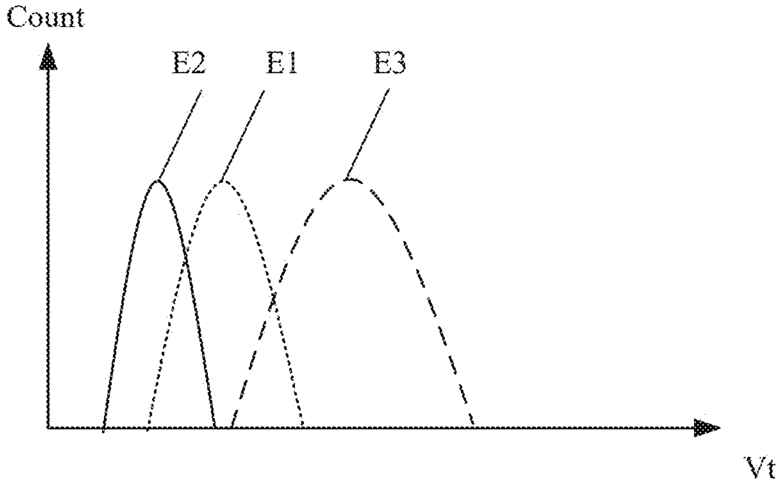
FIG. 8 is a schematic diagram of threshold voltage distributions of erase states provided by an example of the present disclosure.

FIG. 8 is a schematic diagram of threshold voltage distributions of erase states provided by an example of the present disclosure. Referring to FIG. 8, the maximum threshold voltage in the threshold voltage distribution corresponding to a first erase state E1 may be greater than the maximum threshold voltage in the threshold voltage distribution corresponding to a second erase state E2, and the maximum threshold voltage in the threshold voltage distribution corresponding to the first erase state E1 may be less than the maximum threshold voltage in the threshold voltage distribution corresponding to a third erase state E3.

It may be understood that, after data is written into the first group of memory blocks 510, the memory cells in the first group of memory blocks 510 may have 2 different memory states; after data is written into the second group of memory blocks 520, the memory cells in the second group of memory blocks 520 may have $2^N$ different memory states; and after data is written into the third group of memory blocks 530, the memory cells in the third group of memory blocks 530 may have $2^M$ different memory states. M is greater than N, then $2^M$ is greater than $2^N$, the more memory states there are, and the more corresponding threshold voltage distributions there are. Therefore, the erase depth for the memory cells in the third group of memory blocks 530 should be greater than the erase depth for the memory cells in the second group of memory blocks 520 and greater than the erase depth for the memory cells in the first group of memory blocks 510.

In some examples, the controller 501 is further configured to perform a fourth erase operation on the first group of memory blocks 510 after writing the data in the first group of memory blocks 510 into the second group of memory blocks 520 or the third group of memory blocks 530. For example, after the first flush operation or the second flush operation is performed, the storage capacity of the first group of memory blocks 510 may be released. Here, the fourth erase operation may make the memory cells in the first group of memory blocks 510 to be all in the third erase state E3.

It should be noted that the threshold voltage distributions of the first erase state, the second erase state, and the third erase state provided in the foregoing example are merely examples, and are not specific limitation to the memory system provided in the present disclosure.

In an example of the present disclosure, the controller 501 may be configured to perform the first flush operation or the second flush operation on the data in the first group of memory blocks 510 based on the state of the first flag bit and the second flag bit. In an example, the controller 501 may be configured to: in response to the first flag bit being in the state indicating to perform the first flush operation on the data in the first group of memory blocks 510 and the link between the controller 501 and the host 600 being in the hibernate state, perform the first flush operation to write the data in the first group of memory blocks 510 into the second group of memory blocks 520. For example, the controller 501 may utilize the frequent and short hibernate states to perform the flush operation more quickly, and release the storage capacity of the first group of memory blocks 510 timely, thereby improving the write performance of the memory system 500. In addition, when the link exits the hibernate state, the response speed of the controller 501 to the first batch of input/output commands received through the host interface 5012 may also be kept relatively fast, thereby comprehensively improving the input/output performance of the memory system 500.

Based on a concept similar to the memory system described above, the present disclosure further provides a system. Referring to FIG. 6 and FIG. 7, the system includes the memory system 500 and the host 600 coupled to the memory system. The memory system 500 includes the memory device 502 and the controller 501 coupled to the memory device 502. The memory device 502 includes at least a first group of memory blocks 510, a second group of memory blocks 520 and a third group of memory blocks 530. The host 600 is configured to send a first request, the first request indicates to configure a first flag bit to be in a state indicating to perform a first flush operation on data in the first group of memory blocks 510. The controller 501 is configured to: in response to the first request, configure the first flag bit to be in the state indicating to perform the first flush operation on the data in the first group of memory blocks 510; and in response to the first flag bit being in the state indicating to perform the first flush operation on the data in the first group of memory blocks 510, and a link between the controller 501 and the host 600 entered a hibernate state, perform the first flush operation to write the data in the first group of memory blocks 510 into the second group of memory blocks 520. The host 600 is further configured to: send a second request, the second request indicates to configure a second flag bit to be in a state indicating to perform a second flush operation on the data in the first group of memory blocks 510. The controller 501 is further configured to: in response to the second request, configure the second flag bit to be in the state indicating to perform a second flush operation on the data in the first group of memory blocks 510; and in response to the second flag bit being in the state indicating to perform the second flush operation on the data in the first group of memory blocks 510, perform the second flush operation to write the data in the first group of memory blocks 510 into the third group of memory blocks 530.

In some examples, memory cells in the first group of memory blocks 510 are configured to store 1 bit of data; memory cells in the second group of memory blocks 520 are configured to store N bits of data; memory cells in the third group of memory blocks 530 are configured to store M bits of data; N is an integer greater than 1, and M is an integer greater than N.

Figure 9:
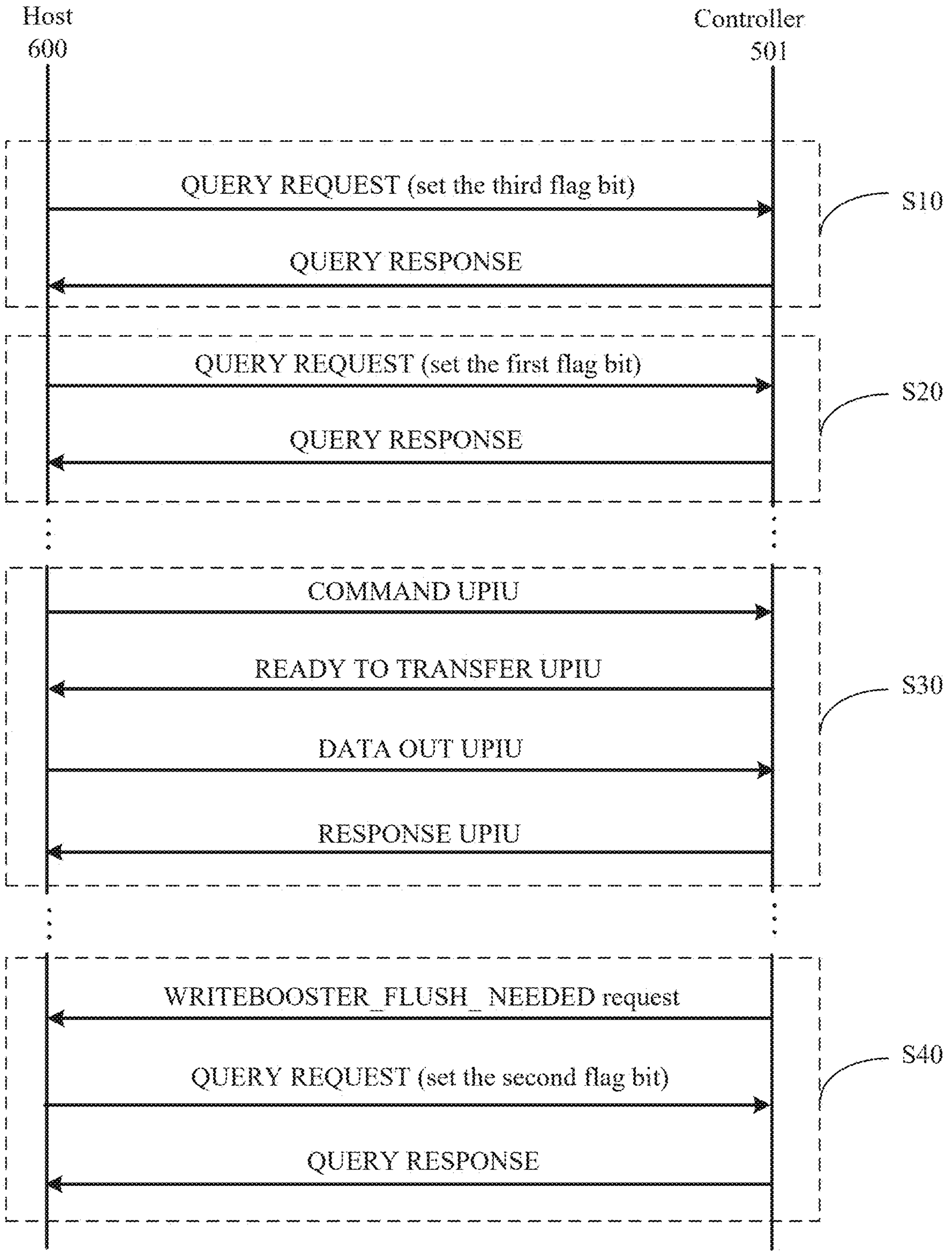
FIG. 9 is a schematic diagram of signal interaction between a host and a controller in a system provided by an example of the present disclosure.

FIG. 9 is a schematic diagram of signal interaction between a host and a controller in a system provided by an example of the present disclosure. In some examples, a first request sent by the host 600 may be QUERY REQUEST indicating to set a first flag bit (fWriteBoosterBufferFlushDuringHibernate) in operation 520. The controller 501 may, in response to the first request, set the first flag bit to 1 and send QUERY RESPONSE to the host 600.

In some examples, the host 600 is further configured to: before sending the first request, send a fourth request, the fourth request indicates to configure a third flag bit to be in a state indicating to write data into the first group of memory blocks 510. The controller 501 is further configured to: in response to the fourth request, configure the third flag bit to be in the state indicating to write data into the first group of memory blocks 510.

In some examples, referring to FIG. 9, the fourth request may be a query request indicating to set the third flag bit (fWriteBoosterEn) in operation 510. The controller 501 may, in response to the fourth request, set the third flag bit to 1 and send a query response to the host 600. Therefore, the write booster function may be enabled, and in this case, the controller 501, when receiving a write command and written data, will write the written data into the first group of memory blocks 510.

In some examples, the host 600 is further configured to: send a write command and written data. The controller 501 is further configured to: in response to the write command, receive the written data; and in response to the third flag bit being in a state indicating to write data into the first group of memory blocks 510, write the written data into the first group of memory blocks 510.

In some examples, referring to FIG. 9, in operation 530, the host 600 may send the write command, e.g., a command UFS protocol information unit (COMMAND UPIU) indicating a write operation, to the controller 501. The controller 501 may send READY TO TRANSFER UPIU (RTT UPIU) to the host 600 in response to the write command. The host 600 may further send DATA OUT UPIU including written data to the controller 501. The controller 501 may receive the written data, and write the written data into the first group of memory blocks 510 in response to the third flag bit being in a state indicating to write data into the first group of memory blocks 510. After the written data is written into the first group of memory blocks 510, the controller 501 may send RESPONSE UPIU to the host 600, RESPONSE UPIU may include completion response information for the write operation.

In some examples, the controller 501 is further configured to perform a third erase operation on the first group of memory blocks 510 before writing the written data into the first group of memory blocks 510.

In some examples, referring to FIG. 8, the third erase operation may adjust the threshold voltages of the memory cells in the first group of memory blocks 510 to be within the range of the threshold voltage distribution corresponding to the erase state of the SLC (e.g., the third erase state E3).

In an example of the present disclosure, the first group of memory blocks 510 may be configured as a write booster buffer, and the speed of writing data into the first group of memory blocks 510 is higher than the speed of writing data into the second group of memory blocks 520 or the third group of memory blocks 530, therefore the controller 501 may generate completion response information for the write operation more quickly, such that the write performance of the system may be improved.

In some examples, in a case that the third flag bit is configured to be in the state indicating to write data into the first group of memory blocks 510, and the first flag bit is configured to indicate to perform the first flush operation on the data in the first group of memory blocks 510, when the link between the host 600 and the controller 501 enters the hibernate state, the controller 501 may perform the first flush operation to write the data in the first group of memory blocks 510 into the second group of memory blocks 520.

In some examples, the controller 501 is further configured to: perform a first erase operation on the second group of memory blocks 520 before writing the data in the first group of memory blocks 510 into the second group of memory blocks 520; and perform a fourth erase operation on the first group of memory blocks 510 after writing the data in the first group of memory blocks 510 into the second group of memory blocks 520.

In some examples, referring to FIG. 8, the first erase operation may adjust the threshold voltages of the memory cells in the second group of memory blocks 520 to be within the range of the threshold voltage distribution corresponding to the erase state of TLC (e.g., the first erase state E1); and the fourth erase operation may adjust the threshold voltages of the memory cells in the first group of memory blocks 510 to be within the range of the threshold voltage distribution corresponding to the erase state of SLC (e.g., the third erase state E3).

In an example of the present disclosure, since the memory cells in the second group of memory blocks 520 are configured to store N bits of data, the memory cells in the third group of memory blocks 530 are configured to store M bits of data, and M is greater than N, thus with the data amount being the same, the speed of writing the data in the first group of memory blocks 510 into the second group of memory blocks 520 is higher than the speed of writing the data in the first group of memory blocks 510 into the third group of memory blocks 530. The controller 501 in the system is configured to write the data in the first group of memory blocks 510 into the second group of memory blocks 520 instead of the third group of memory blocks 530 when the first flag bit is 1 and the link is in the hibernate state, so that frequent and short hibernate states can be utilized to perform the flush operations more quickly to release the storage capacity of the first group of memory blocks 510 timely, thereby improving the write performance of the system. In addition, when the link between the host 600 and the controller 501 exits the hibernate state, the response speed of the controller 501 to the first batch of input/output commands received through the host interface 5012 may also be kept relatively fast, thereby comprehensively improving the working efficiency of the system.

In some examples, the controller 501 is further configured to send a third request in response to an amount of data stored in the first group of memory blocks 510 being greater than or equal to a preset data amount; and the host 600 is further configured to generate a second request in response to the third request.

In some examples, referring to FIG. 9, in operation 540, when the link between the host 600 and the controller 501 cannot enter the hibernate state for a long time or the hibernate state is too short, the amount of data in the first group of memory blocks 510 may be greater than or equal to the preset data amount. For example, the first group of memory blocks 510 is already in a state in which no more data can be written. The controller 501 may send the third request, for example, a write booster flush needed request (WRITEBOOSTER_FLUSH_NEEDED), to the host 600. The host 600 may generate the second request in response to the third request, the second request may be a query request indicating to set a second flag bit (fWriteBoosterBuffer-FlushEn). The controller 501 may configure, in response to the second request, the second flag to be in a state indicating to perform a second flush operation on the data in the first group of memory blocks 510, for example, set the second flag bit to 1, and then send a query response to the host 600. Thus, the controller 501 may perform, in response to the second flag bit being in the state indicating to perform the second flush operation on the data in the first group of memory blocks 510, the second flush operation to write the data in the first group of memory blocks 510 into the third group of memory blocks 530.

In some examples, the controller 501 is further configured to perform a second erase operation on the third group of memory blocks 530 before writing the data in the first group of memory blocks 510 into the third group of memory blocks 530.

In some examples, referring to FIG. 8, the second erase operation may adjust the threshold voltages of the memory cells in the third group of memory blocks 530 to be within the range of the threshold voltage distribution corresponding to the erase state of the QLC (e.g., the second erase state E2).

In an example of the present disclosure, in order to enable the write booster function to operate normally, when the amount of data stored in the first group of memory blocks 510 is greater than or equal to the preset data amount, the second flush operation may be performed on the data in the first group of memory blocks 510, so as to write the data in the first group of memory blocks 510 into the third group of memory blocks 530 with a higher storage density, which may avoid the case in which the data in the second group of memory blocks 520 still needs to be transferred to the third group of memory blocks 530 when the data amount is large, thereby completing the flush operation in a more efficient manner.

Figure 10:
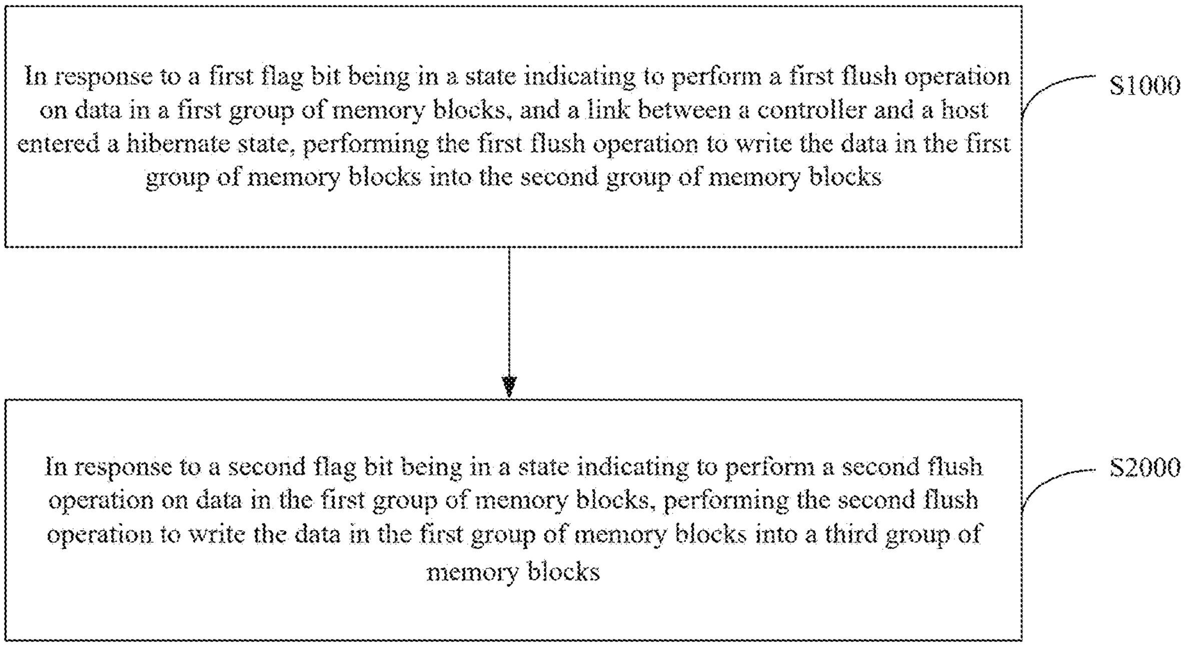
FIG. 10 is a schematic flowchart of an operating method for a memory system provided by an example of the present disclosure.

Based on a concept similar to the foregoing memory system, the present disclosure further provides an operating method for a memory system. FIG. 10 is a schematic flowchart of an operating method for a memory system provided by an example of the present disclosure, and as shown in FIG. 10, the operating method for the memory system includes the following operations:

operation S1000: in response to a first flag bit being in a state indicating to perform a first flush operation on data in a first group of memory blocks and a link between a controller and a host entered a hibernate state, performing the first flush operation to write the data in the first group of memory blocks into the second group of memory blocks;

operation S2000: in response to a second flag bit being in a state indicating to perform a second flush operation on data in the first group of memory blocks, performing the second flush operation to write the data in the first group of memory blocks into a third group of memory blocks.

In some examples, the operating method for the memory system further includes: configuring memory cells in the first group of memory blocks to store 1 bit of data; configuring memory cells in the second group of memory blocks to store N bits of data; and configuring memory cells in the third group of memory blocks to store M bits of data; and N is an integer greater than 1, M is an integer greater than N.

In some examples, the operating method for the memory system further includes: in response to an amount of data stored in the first group of memory blocks being greater than or equal to a preset data amount, configuring the second flag bit to be in a state indicating to perform the second flush operation on the data in the first group of memory blocks.

In some examples, the operating method for the memory system further includes: performing a first erase operation on the second group of memory blocks before writing the data in the first group of memory blocks into the second group of memory blocks; and performing a second erase operation on the third group of memory blocks before writing the data in the first group of memory blocks into the third group of memory blocks.

In some examples, the operating method for the memory system further includes: receiving written data before performing the first flush operation and the second flush operation; and writing the written data into the first group of memory blocks in response to a third flag bit being in a state indicating to write the data into the first group of memory blocks.

In some examples, the operating method for the memory system further includes: performing a third erase operation on the first group of memory blocks before writing the written data into the first group of memory blocks.

In some examples, the operating method for the memory system further includes: performing a fourth erase operation on the first group of memory blocks after writing the data in the first group of memory blocks into the second group of memory blocks.

The features disclosed in the several device examples provided by the present disclosure may be arbitrarily combined without conflict to obtain a new device example.

The methods disclosed in the several method examples provided by the present disclosure may be arbitrarily combined without conflict to obtain a new method example.

The above are merely examples of the present disclosure, but the protection scope of the present disclosure is not limited thereto, and any person skilled in the art may conceive of changes or substitutions within the technical scope of the present disclosure, which shall be covered within the protection scope of the present disclosure.

What is claimed is:

1. A memory system, comprising:

a memory device, wherein the memory device includes at least a first group of memory blocks, a second group of memory blocks and a third group of memory blocks; and a controller coupled to the memory device and configured to:

in response to a first flag bit being in a state indicating to perform a first flush operation on data in the first group of memory blocks, and a link between the controller and a host being in a hibernate state, perform the first flush operation to write the data in the first group of memory blocks into the second group of memory blocks; and in response to a second flag bit being in a state indicating to perform a second flush operation on data in the first group of memory blocks, perform the second flush operation to write the data in the first group of memory blocks into the third group of memory blocks.

2. The memory system of claim 1, wherein first memory cells in the first group of memory blocks are each configured to store 1 bit of data;

second memory cells in the second group of memory blocks are each configured to store N bits of data, wherein N is an integer greater than 1; and third memory cells in the third group of memory blocks are each configured to store M bits of data, wherein M is an integer greater than N.

3. The memory system of claim 2, wherein the controller is further configured to:

in response to an amount of data stored in the first group of memory blocks being greater than or equal to a preset data amount, configure the second flag bit to be in the state indicating to perform the second flush operation on the data in the first group of memory blocks.

4. The memory system of claim 2, wherein the controller is further configured to:

perform a first erase operation on the second group of memory blocks before writing the data in the first group of memory blocks into the second group of memory blocks; and perform a second erase operation on the third group of memory blocks before writing the data in the first group of memory blocks into the third group of memory blocks.

5. The memory system of claim 4, wherein the controller is further configured to:

receive written data before performing the first flush operation and the second flush operation; and in response to a third flag bit being in a state indicating to write the written data into the first group of memory blocks, write the written data into the first group of memory blocks.

6. The memory system of claim 5, wherein the controller is further configured to:

perform a third erase operation on the first group of memory blocks before writing the written data into the first group of memory blocks.

7. The memory system of claim 1, wherein the controller is further configured to:

perform a fourth erase operation on the first group of memory blocks after writing the data in the first group of memory blocks into the second group of memory blocks.

8. A system, comprising:
a memory system, comprising:
a memory device, wherein the memory device includes at least a first group of memory blocks, a second group of memory blocks and a third group of memory blocks; and
a controller coupled to the memory device; and
a host coupled to the memory system,
wherein:
the host is configured to:
send a first request, wherein the first request indicates to configure a first flag bit to be in a state indicating to perform a first flush operation on data in the first group of memory blocks;
the controller is configured to:
in response to receiving the first request, configure the first flag bit to be in the state indicating to perform the first flush operation on the data in the first group of memory blocks; and
in response to the first flag bit being in the state indicating to perform the first flush operation on the data in the first group of memory blocks, and a link between the controller and the host being in a hibernate state, perform the first flush operation to write the data in the first group of memory blocks into the second group of memory blocks;
the host is further configured to:
send a second request, wherein the second request indicates to configure a second flag bit to be in a state indicating to perform a second flush operation on data in the first group of memory blocks; and
the controller is further configured to:
in response to receiving the second request, configure the second flag bit to be in the state indicating to perform the second flush operation on the data in the first group of memory blocks; and
in response to the second flag bit being in the state indicating to perform the second flush operation on the data in the first group of memory blocks, perform the second flush operation to write the data in the first group of memory blocks into the third group of memory blocks.

9. The system of claim 8, wherein:
a first memory cell in the first group of memory blocks is configured to store 1 bit of data;
a second memory cell in the second group of memory blocks is configured to store N bits of data, wherein N is an integer greater than 1; and
a third memory cell in the third group of memory blocks is configured to store M bits of data, wherein M is an integer greater than N.

10. The system of claim 9, wherein:
the controller is further configured to:
in response to an amount of data stored in the first group of memory blocks being greater than or equal to a preset data amount, send a third request; and
the host is further configured to:
in response to the third request, generate the second request.

11. The system of claim 9, wherein the controller is further configured to:
perform a first erase operation on the second group of memory blocks before writing the data in the first group of memory blocks into the second group of memory blocks; and
perform a second erase operation on the third group of memory blocks before writing the data in the first group of memory blocks into the third group of memory blocks.

12. The system of claim 11, wherein:
the host is further configured to:
send a fourth request before sending the first request, wherein the fourth request indicates to configure a third flag bit to be in a state indicating to write data into the first group of memory blocks; and
the controller is further configured to:
in response to the fourth request, configure the third flag bit to be in the state indicating to write data into the first group of memory blocks.

13. The system of claim 12, wherein:
the host is further configured to:
send a write command and written data; and
the controller is further configured to:
in response to the write command, receive the written data; and
in response to the third flag bit being in the state indicating to write the written data into the first group of memory blocks, write the written data into the first group of memory blocks.

14. An operating method for a memory system, comprising:
in response to a first flag bit being in a state indicating to perform a first flush operation on data in a first group of memory blocks, and a link between a controller and a host being in a hibernate state, performing the first flush operation to write the data in the first group of memory blocks into a second group of memory blocks; and
in response to a second flag bit being in a state indicating to perform a second flush operation on data in the first group of memory blocks, performing the second flush operation to write the data in the first group of memory blocks into a third group of memory blocks.

15. The operating method for the memory system of claim 14, further comprising:
configuring a first memory cell in the first group of memory blocks to store 1 bit of data;
configuring a second memory cell in the second group of memory blocks to store N bits of data, wherein N is an integer greater than 1; and
configuring a third memory cell in the third group of memory blocks to store M bits of data, wherein M is an integer greater than N.

16. The operating method for the memory system of claim 15, further comprising:
in response to an amount of data stored in the first group of memory blocks being greater than or equal to a preset data amount, configuring the second flag bit to be in the state indicating to perform the second flush operation on the data in the first group of memory blocks.

17. The operating method for the memory system of claim 16, further comprising:
performing a first erase operation on the second group of memory blocks before writing the data in the first group of memory blocks into the second group of memory blocks; and
performing a second erase operation on the third group of memory blocks before writing the data in the first group of memory blocks into the third group of memory blocks.

18. The operating method for the memory system of claim 17, further comprising:

receiving written data before performing the first flush operation and the second flush operation; and in response to a third flag bit being in a state indicating to write the written data into the first group of memory blocks, writing the written data into the first group of memory blocks.

19. The operating method for the memory system of claim 18, further comprising:

performing a third erase operation on the first group of memory blocks before writing the written data into the first group of memory blocks.

20. The operating method for the memory system of claim 14, further comprising:

performing a fourth erase operation on the first group of memory blocks after writing the data in the first group of memory blocks into the second group of memory blocks.

* * * * *